US012736302B2

(12) United States Patent
Sandrin

(10) Patent No.: US 12,736,302 B2
(45) Date of Patent: Sep. 15, 2026

(54) BUTT PLATE

(71) Applicant: ROSA S.P.A., Porcia (IT)

(72) Inventor: Giannino Sandrin, Porcia (IT)

(73) Assignee: ROSA S.P.A., Porcia (IT)

( * ) Notice: Subject to any disclaimer, the term of this patent is extended or adjusted under 35 U.S.C. 154(b) by 0 days.

(21) Appl. No.: 19/357,415

(22) Filed: Oct. 14, 2025

(65) Prior Publication Data

US 2026/0104229 A1 Apr. 16, 2026

(30) Foreign Application Priority Data

Oct. 16, 2024 (IT) ........................ 102024000023073

(51) Int. Cl.

*F41C 23/08* (2006.01)
*B29C 45/14* (2006.01)
*B29K 21/00* (2006.01)
*B29L 31/00* (2006.01)

(52) U.S. Cl.

CPC ........ *F41C 23/08* (2013.01); *B29C 45/14467* (2013.01); *B29C 45/14631* (2013.01); *B29C 45/14786* (2013.01); *B29C 2045/1454* (2013.01); *B29C 2045/14868* (2013.01); *B29K 2021/003* (2013.01); *B29L 2031/721* (2013.01); *B29L 2031/777* (2013.01)

(58) Field of Classification Search

CPC ...................................................... F41C 23/08
USPC ............................................................. 42/74
See application file for complete search history.

(56) References Cited

U.S. PATENT DOCUMENTS 345,120 A 7/1886 Cottrell
666,564 A 1/1901 Shaw
1,222,190 A 4/1917 Dimelow
2,188,691 A 1/1940 Riagndi
2,468,349 A * 4/1949 Stewart .................. F41C 23/08 42/74
4,683,671 A * 8/1987 Farrar ..................... F41C 23/08 42/74
5,461,813 A 10/1995 Mazzola
6,305,115 B1 * 10/2001 Cook ...................... F41C 23/08 42/74
6,834,456 B2 * 12/2004 Murello .................. F41C 23/08 42/74
2011/0113666 A1 5/2011 Latimer

FOREIGN PATENT DOCUMENTS

DE 2017103418 U1 9/2018
EP 0611189 B1 7/1997
WO 2007033342 A2 3/2007
WO WO-2007034026 A1 * 3/2007 ............. F41C 23/08

OTHER PUBLICATIONS

Search Report From EPO (Dated Apr. 16, 2025) in Priority Italian Patent Application No. 102024000023073.

* cited by examiner

*Primary Examiner* — Reginald S Tillman, Jr.
(74) *Attorney, Agent, or Firm* — Carmel Patent Agency; Robert Ballarini

(57) ABSTRACT

A butt plate includes a damping member which is made from resiliently flexible material and a covering which at least partially covers the damping member. The damping member is made from injectable material, which is over-injected on the covering so as to make a single member with the covering. The covering has a perimeter including at least two flaps which extend astride the damping member.

20 Claims, 3 Drawing Sheets

BUTT PLATE

CROSS-REFERENCE TO RELATED APPLICATIONS

This application claims benefit of Italian Patent Application Number 102024000023073, filed Oct. 16, 2024, the entire contents of which are incorporated by reference herein as if fully set forth.

FIELD OF THE INVENTION

The present invention relates to a butt plate comprising a damping member and a covering in order to at least partially cover the damping member.

BACKGROUND

In the field of firearms, the use of butt plates is known, which elements are suitable for being associated with the stock of the weapon, i.e. the rear portion of the weapon, and intended to come into contact with the shooter's shoulder when the weapon is shouldered. The butt plates are generally made from soft material, which allows not only to give a certain comfort to the user who rests the weapon on his/her shoulder, but also to cushion its recoil after shooting.

In particular, the butt plates of known type comprise a damping member made from resiliently flexible material such as, for example, rubber. It would be desirable to customize this type of butt plates with the application of an appropriate covering. However, the application of a covering on the damping member entails considerable technical difficulties in that the covering must adhere to a surface with three-dimensional curvature and must maintain the adhesion even after elastic deformation of the damping member during use. In particular, turning over the covering on the perimeter surface of the damping member may cause wrinkles to form in the covering itself. In addition to giving an unpleasant aesthetic appearance, the wrinkles lead to a localized overlap of portions of the covering, creating points of weakness at which the covering could lift and detach from the damping member, especially following compression of the damping member during use.

Examples of butt plates made in accordance with the known art are described in U.S. Pat. No. 2,188,691A, US345120A, U.S. Pat. No. 1,222,190A, US666564A, DE202017103418U1, U.S. Pat. No. 5,461,813A, US20110113666A1, WO2007033342A2 or EP0611189B1.

The task of the present invention is to remedy at least some of the inconveniences complained of above.

As part of this task, one object of the invention is to make a butt plate that is structurally resistant and suitable for counteracting the appearance of wrinkles.

Another object of the invention is to make available a butt plate that is simple and fast to make.

A further object of the invention is to make a butt plate at competitive costs.

Another object of the invention is to develop a butt plate that is customizable with greater versatility than the butt plates of known type.

An object of the invention is also to make available a butt plate that has particular effectiveness or convenience of application or use.

SUMMARY

These and other objects, which will become better apparent hereinafter, are achieved at least in part by the invention in one aspect by a butt plate according to one or more of the features of the appended claims.

The butt plate comprises a damping member which is made from resiliently flexible material. The butt plate further comprises a covering which at least partially covers the damping member. Advantageously, the resiliently flexible material guarantees deformability to the damping member, so that it can be compressed to cushion, for example, the recoil of a firearm (with which the butt plate is intended to be associated) after shooting. The covering, on the other hand, allows, appropriately, to cover and protect the damping member and to define a surface for resting the butt plate to the user's body, while offering a wide range of possibilities for the customization of the butt plate.

Preferably the covering has a perimeter comprising two or more flaps which can extend laterally with respect to the damping member. Preferably the flaps extend astride the damping member, in particular with at least one flap on one side of the damping member and at least another flap on the opposite side. In other words, the flaps embrace the damping member, in particular from opposite sides thereof. In this way, the flaps improve the anchoring of the covering to the damping member and counteract the detachment thereof due to elastic deformation during use.

In embodiments the damping member comprises at least one curved portion astride which the flaps are arranged. In other words, the curved portion is interposed between the flaps. In a preferred example, the damping member extends longitudinally between two curved portions astride which the flaps are arranged. Advantageously, the flaps of the covering embrace the opposite sides of the curved portion(s) of the damping member. This solution counteracts the detachment of the covering in the region of the curved portions.

It should be specified that, in this context, "flap" preferably means an appendage of the covering which extends laterally with respect to the damping member and/or bends around it. In this way, the flaps can extend astride the damping member so as to embrace it from opposite parts of its lateral surface.

Preferably the covering is made from a flexible material. In embodiments, the covering is made from a material selected from woven fabric, non-woven fabric, leather and artificial leather or synthetic leather. The Applicant has found that such materials guarantee a high resistance when they are coupled to the damping member, especially if they are coupled by over-injection of the damping member as illustrated in detail below. In embodiments the woven fabric may be made from natural (e.g. cotton) or synthetic (e.g. polyamide or polyester) fibers. In embodiments the non-woven fabric may comprise vinyl, Alcantara® or the like. In a preferred example, the butt plate comprises a pre-printed graphic on the covering, in particular on the fabric, preferably with a sublimation technique. The pre-printed graphic may comprise for example a brand, a logo and/or a customized background.

Preferably the covering has a discontinuous perimeter. Advantageously, the discontinuous perimeter allows the adhesion of the covering also to surfaces with three-dimensional curvature and/or to elastically deformable surfaces such as the surface of the damping member. This solution counteracts the appearance of wrinkles and favors the maintenance of the adhesion of the covering even after the elastic deformation of the damping member during use.

It should be specified that, in this context, "discontinuous perimeter" is preferably intended to mean a contour or an edge that is not continuous or uniform, but interrupted or fragmented at one or more points. In other words, the perimeter is not an uninterrupted line, but it has interruptions or variations that can be caused by empty spaces, angles or stretches of different length.

In a preferred example, the perimeter of the covering may comprise a sequence of broken segments that follow an irregular profile, in particular zigzag-like, possibly alternated with straight segments, so as to adapt to the three-dimensional curvature of the damping member.

It will be appreciated that a partial coverage of the covering of the damping member with an appropriate flap or discontinuous conformation of the perimeter of the covering makes it possible to counteract the detachment of the covering and prevent the formation of wrinkles on the covering itself when it is coupled to the damping member. In this way, in addition to a pleasant aesthetic appearance, this feature substantially allows to eliminate areas of structural weakness that could derive from an overlap of portions of the covering itself.

Preferably, the damping member is made from injectable material and is over-injected on the covering so as to make a single member with it. This configuration allows to maintain a permanent adhesion of the covering even during the elastic deformations in use and allows the production in a single integrated process. The Applicant has found that this coupling technique between the damping member and the covering is particularly effective in case of a covering made from woven fabric, non-woven fabric, leather or artificial leather, thus allowing the butt plate to be customized with a wide range of materials. In addition, over-injection favors the adhesion of the covering even following the elastic deformation of the damping member during use.

The over-injection of the damping member onto the covering, in combination with the flaps that extend astride the damping member itself, creates a particularly effective structural anchorage as the flaps are incorporated into the injected material during the process for the formation of the single member. This synergy between the coupling technique by over-injection and the geometric flap configuration allows the covering to remain firmly anchored to the damping member even during the elastic deformations generated by the recoil of the weapon, effectively preventing detachment or lifting phenomena of the covering that could occur with traditional coupling techniques. Furthermore, this solution eliminates the need for adhesives or other intermediate fixing means, simplifying the production process and increasing the reliability of the final product.

It should be specified that, in this context, "over-injection" is intended to mean in particular a molding process in which the material of the damping member is injected directly onto the covering, which has preferably been previously positioned in the mold, creating a direct adhesion between the two components during the step of formation of the damping member itself.

Alternatively, the covering can be associated with the damping member through interposition of a suitable adhesive. However, it is preferred that the coupling between the damping member and the covering takes place by over-injection as over-injection does not require the use of an adhesive to be interposed between the damping member and the covering and, consequently, costly steps-in economic terms and in terms of time-within the production process. In fact, in addition to the actual gluing step, it would be necessary to provide for a drying time, which varies depending on the type of adhesive and depending on the conditions to which the damping member and the covering are subjected following the interposition of the adhesive itself. If it is wished, for example, to accelerate drying times in respect to exposure to ambient conditions, it might be necessary to use expensive machinery which, among other things, requires greater energy consumption than the production of the individual elements. In addition, such a process requires that the adhesive suitable for gluing is always available in stock. In any case, the butt plate deriving from the over-injection process drastically reduces the risk that the covering may separate and/or lift from the damping member, since it is over-molded on it, therefore associated with it directly during the step of its formation.

In some preferred embodiments, the butt plate comprises a base for anchoring to the stock of a firearm.

In this way, the butt plate is removably associable with the weapon.

In preferred embodiments, the aforementioned single member also integrates the base. Suitably, in this way, the base confers structural rigidity to the butt plate.

In some embodiments, the damping member is over-injected both on the covering and on the base. This feature optimizes the production process because it allows to make the damping member and simultaneously couple it to both the base and the covering with a single over-injection operation.

Preferably, the material of the damping member is a plastic material. Preferably, the plastic material is a thermoplastic rubber.

In some embodiments, the damping member comprises a main surface opposite the base and a lateral surface which extends between the base and the main surface. Preferably, the main and lateral surfaces are at least partially covered by the covering. Preferably the flaps extend in the region of the lateral surface, in particular from opposite sides of the damping member.

Suitably, a partial coverage of the covering of the damping member, with an appropriate geometric conformation of the surface of the covering which is intended to come into contact with the lateral surface, allows to further counteract the appearance of wrinkles on the covering itself when it is coupled to the damping member.

Preferably, the damping member has a surface with three-dimensional curvature. For example, the main and lateral surfaces of the damping member define a surface with three-dimensional curvature. This feature gives the butt plate greater comfort of use and facilitates the over-injection process of the damping member on the covering.

Preferably, the covering is peripherally terminated in the region of the lateral surface of the damping member. In this way the flaps or discontinuities of the perimeter can develop in the region of the lateral surface and in particular the flaps can develop in the direction away from the main surface of the damping member. These features also contribute to maintaining a better adhesion of the covering following the elastic deformation of the damping member during use.

In some embodiments, the covering comprises a contact portion which is arranged so as to cover the main surface and intended to face or rest on the body of the user. Preferably, the flaps project away from the contact portion and preferably towards the base. Preferably, the flaps have a tapered shape in the direction away from the contact portion and preferably towards the base. In exemplary embodiments, the flaps have a substantially triangular, substantially trapezoidal, substantially sinusoidal or at least partially curvilinear shape.

Advantageously, such a geometric shape allows the covering to counteract the appearance of wrinkles once it is associated with the damping member while at the same time providing a particularly effective customization effect.

In some embodiments, at least two consecutive flaps are spaced apar from each other.

Suitably, this is done in the region of surfaces with a high curvature to avoid wrinkles of the covering.

It will be appreciated that the butt plate according to the present invention lends itself particularly well to being used with individual shoulder weapons such as rifles or carbines.

According to a further aspect of the present solution, a method for making a butt plate is provided. The method may comprise providing a covering having a perimeter which comprises two or more flaps. The method may further comprise positioning the covering in a mold so that the flaps are configured to extend astride a damping member to be formed. The method may comprise over-injecting an injectable resiliently flexible material onto the covering to form the damping member, making a single member with the covering. In this way, the covering can at least partially cover the damping member and the flaps can extend astride the damping member.

Advantageously, this method allows the butt plate to be made in a single integrated process, eliminating the need for separate assembly steps and promoting permanent adhesion between the covering and the damping member. The simultaneous formation of the damping member and its coupling with the covering by over-injection ensure that the flaps are incorporated into the injected material, creating a particularly effective structural anchoring that prevents the detachment of the covering even during elastic deformations in use. In addition, the method significantly reduces production times and costs compared to traditional techniques that would require the application of adhesives and related drying times.

The method may further comprise one or more of the preferred features described above in relation to the butt plate. For example, the method may comprise positioning an anchoring base in the mold prior to over-injection. The injectable resiliently flexible material can be over-injected both on the covering and on the base so as to make a single member that integrates the covering, the damping member and the base. This feature optimizes the production process by allowing the components of the butt plate to be formed and assembled in a single molding operation, eliminating separate assembly steps and allowing a permanent structural coupling between the different elements.

In some embodiments the covering can be made from a material selected from woven fabric, non-woven fabric, leather and artificial leather. The method may comprise pre-printing a graphic on the covering prior to its positioning in the mold. This combination of features allows a versatile aesthetic customization of the final product while maintaining the efficiency of the production process, since the decoration is performed before the over-injection operation without requiring subsequent processing.

BRIEF DESCRIPTION OF THE DRAWINGS

Further characteristics and advantages of the invention will result from the description of a preferred, but not exclusive, embodiment of the butt plate, illustrated by way of non-limiting example, in the accompanying drawings, in which.

DETAILED DESCRIPTION OF THE PREFERRED EMBODIMENTS

Figure 1:
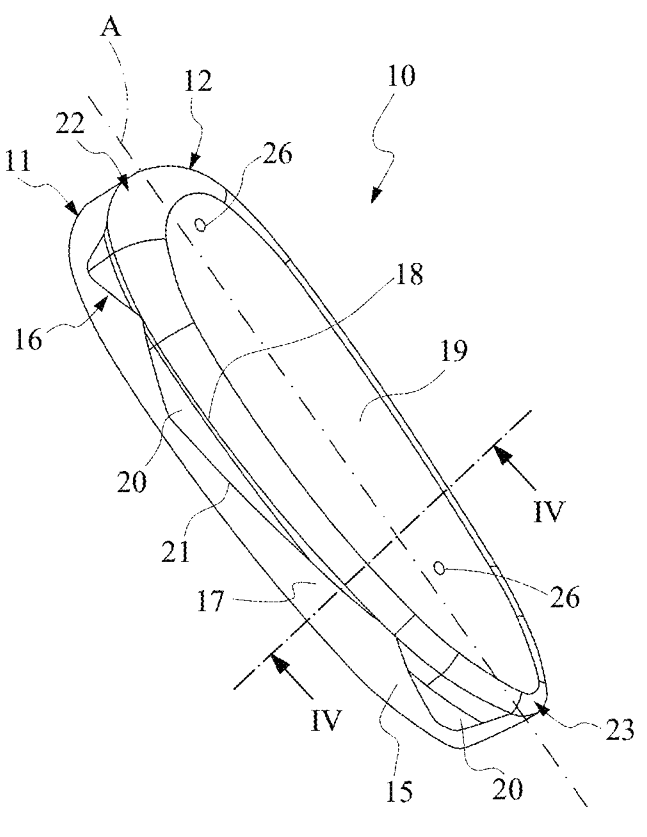
FIG. 1 is a perspective view of the butt plate according to an embodiment of the invention.
Figure 2:
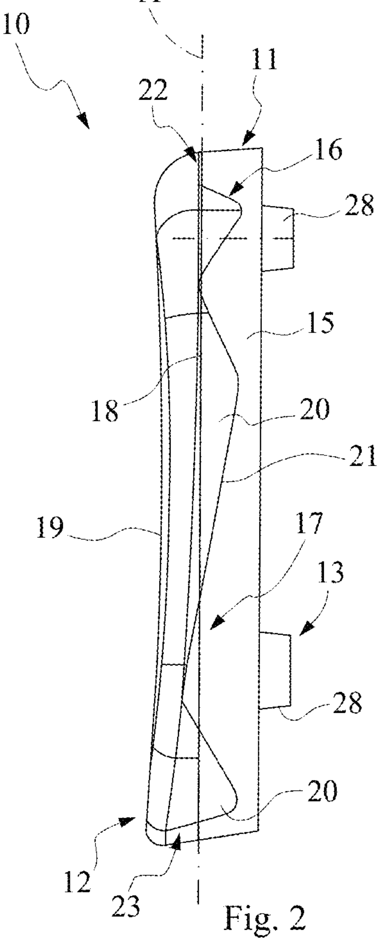
FIG. 2 is an orthogonal view in side elevation of the butt plate represented in FIG. 1.
Figure 3:
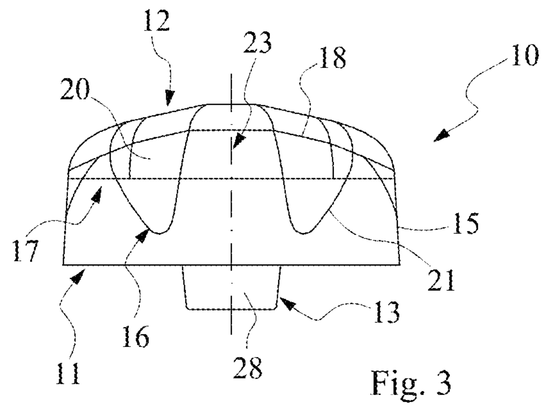
FIG. 3 is an orthogonal view in front elevation of the butt plate represented in the previous figures.

In the figures, 10 indicates a butt plate comprising a damping member 11, which is made from injectable and resiliently flexible material, and a covering 12, which at least partially covers the damping member 11. The covering 12 comprises a material selected from natural fiber fabric, synthetic fiber fabric, non-woven fabric, leather and artificial leather and is substantially a sheet covering, i.e. with thickness much lower than the transverse thickness of the damping member 11.

To counteract the appearance of wrinkles it is preferred that the covering does not exceed 1 or 2 mm in thickness. To ensure sufficient resistance, it is also preferred that the thickness of the covering is not lower than 0.1 or 0.3 mm.

In embodiments it is envisaged that the fabric of the covering 11 is printed with graphics including for example a brand, a logo and/or a customized background. In a preferred example, the graphics are pre-printed with sublimation technique. This technique is particularly effective in the case of synthetic fabric.

A peculiarity of the invention consists in the fact that the damping member 11 is over-injected on the covering so as to make a single member with it.

In the present description, the term "single member" is preferably intended to mean that the damping member 11 and the covering 12 are integrally molded with each other. In other words, the damping member 11 and the covering 12 are made as a monolithic body that does not provide for the association with the two elements already made, but contemplates a formation of the damping member 11 substantially at the same time as its association with the covering 12.

The butt plate 10 comprises a base 13 for anchoring to the stock of a firearm (not represented in the figures), for example a rifle.

Figure 4:
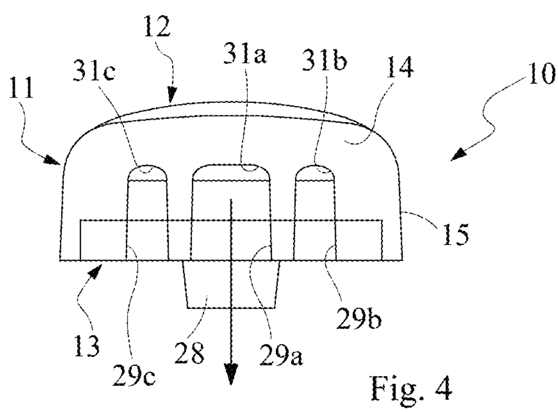
FIG. 4 is a sectional view, taken along plane IV-IV, of the butt plate represented in FIG. 1.
Figure 5:
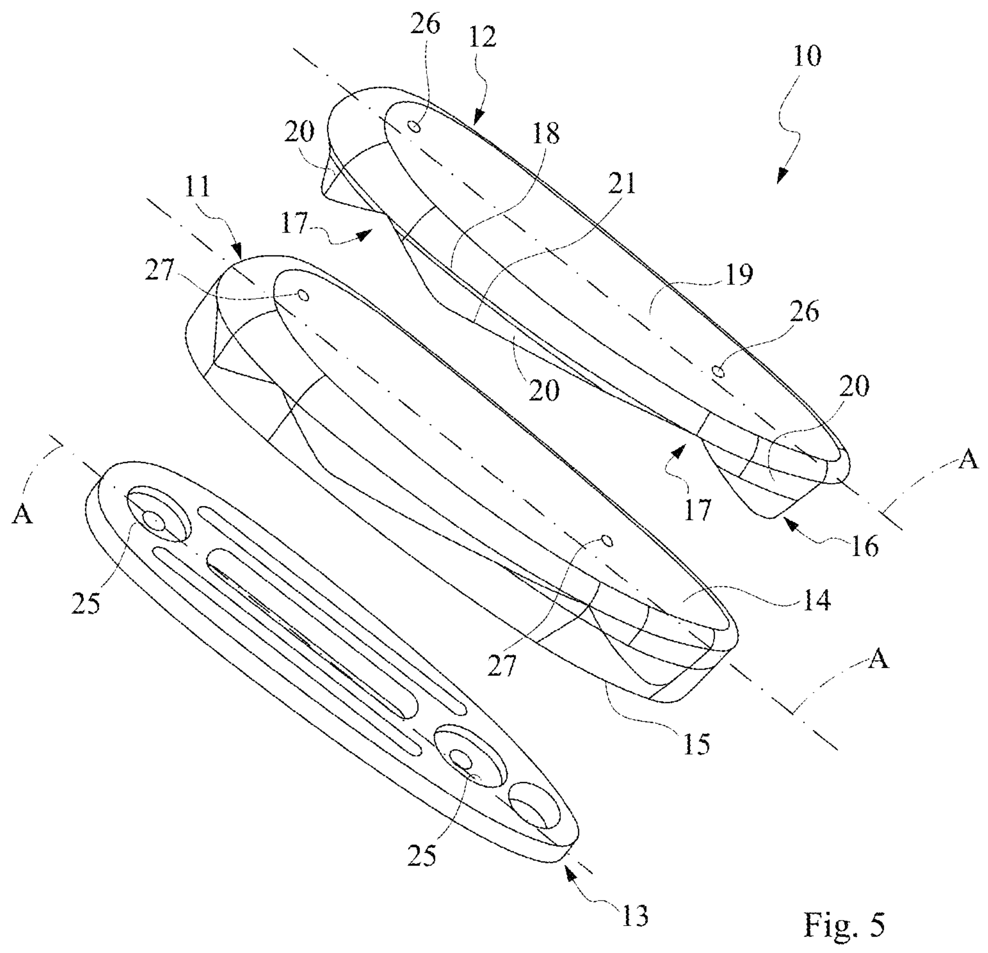
FIG. 5 is an exploded perspective view of the butt plate represented in the previous figures.
Figure 6:
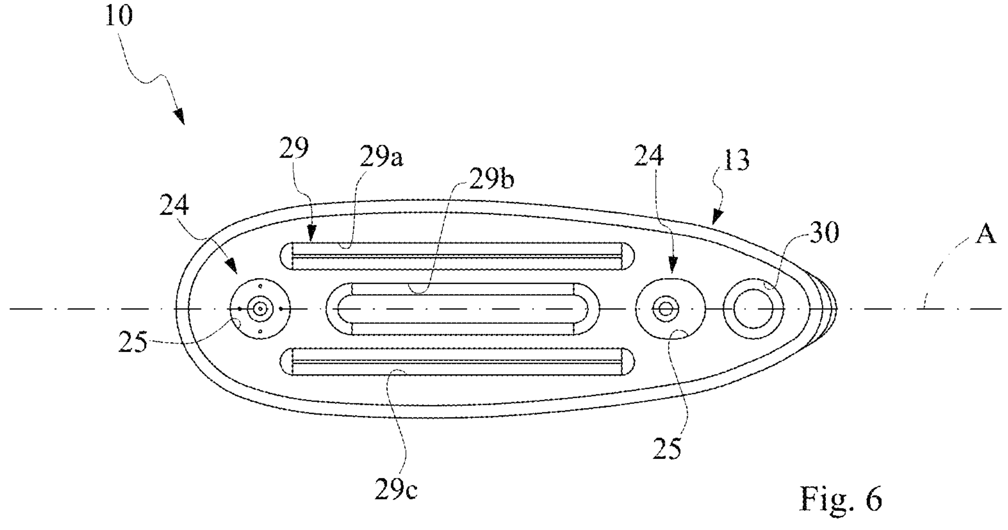
FIG. 6 is an orthogonal plan view from below of the butt plate represented in the previous figures.

In the embodiment represented in the aforementioned figures, the single member of the butt plate 10, which is made from the damping member 11 and the butt plate 12, also integrates the base 13. In fact, for example, during the production process, the damping member 11 is over-injected both on the covering 12 and on the base 13. More particularly, the covering 12 is positioned on the bottom of a mold (not represented in the figures), while the base 13 is placed and retained in position at a certain distance from it, so as to define the volumetric footprint of the damping member 11. The butt plate 10 is then obtained as a single member by injecting, into the volume defined between the covering 12 and the base 13, a resiliently flexible material. The latter may be, for example, a plastic material and more specifically a thermoplastic rubber. In the particular embodiment represented in the figures, the base 13 is also covered laterally by the damping member 11, being substantially embedded in it (as can be seen in FIG. 4). In alternative embodiments, the base 13 can be associated with the bottom of the damping member 11 for example by gluing.

In embodiments, the damping member 11 comprises a main surface 14, opposite the base 13, and a lateral surface 15 which extends between the base 13 and the main surface 14. The main surface 14 and the lateral surface 15, which together define a surface with three-dimensional curvature, are at least partially covered by the covering 12.

Preferably, the covering 12 is peripherally terminated (in the region of a first perimeter profile 21) on the lateral surface 15, having a perimeter 16 that can be defined as with flaps or discontinuous.

With the term "discontinuous perimeter" it is preferably meant that the portion of the covering 12 turned over on the lateral surface 15 of the damping member 11 has a plurality of discontinuities 17, i.e. regions of absence of material of the covering 12 which are defined starting from a second perimeter profile 18 (which substantially separates the perimeter 16 of the covering from a contact portion 19 of the covering, which is arranged so as to cover the main surface 14 and intended to face the user's shoulder), so as to determine a partial covering of the lateral surface 15.

Preferably the perimeter 16 comprises a plurality of flaps 20, projecting away from the contact portion 19 of the covering and preferably in the region of the lateral surface 15 of the damping member. In embodiments two consecutive flaps 20 are arranged substantially astride each one of the aforementioned discontinuities. In other words, the first perimeter profile 21 defines a ridge and valley profile, in which the ridges are determined by the flaps 20 and the valleys by the discontinuities 17.

Preferably, the flaps 20 extend astride the damping member 11 so as to embrace it from opposite parts of its lateral surface 15. This solution counteracts the detachment of the covering due to the elastic deformation of the damping member during use.

In the particular embodiment represented in FIGS. 1-7, the flaps 20 have a substantially triangular geometric shape, which is tapered in the direction away from the main surface 14. In other alternative embodiments, the geometric shape of the flaps 20 may be different, for example substantially trapezoidal (examples of FIGS. 8*a*, 8*b*), partially curvilinear (examples of FIGS. 9*a*, 9*b*, 11*a*, 11*b*), substantially sinusoidal (examples of FIGS. 10*a*, 10*b*), rectangular or semicircular. Preferably, the combination between the longitudinal extension, i.e. in a direction parallel to that identified by the second perimeter profile 18, and the transverse extension, i.e. along the thickness of the damping member 11, of each of the flaps 20 is such as not to be substantially affected by the curvature of the lateral surface 15, so that no wrinkles are generated when the covering 12 is turned over on it.

In embodiments, the butt plate 10 has a main extension along a longitudinal axis A and can further have a geometric conformation in which two sides (not indicated in the figures) which are opposite and extend almost parallel to the longitudinal axis A are connected by two curved portions, identified by reference numerals 22 and 23.

Substantially along such sides, the flaps 20 are preferably adjacent and in contact with each other substantially in the region of the second perimeter profile 18, while, in the region defined by the curved portions 22 and 23, two consecutive flaps 20 are spaced apart from each other. The fact that the flaps 20 are astride the curved portions 22 and 23 allows a more resistant and substantially wrinkle-free covering to be obtained.

More particularly, in the particular embodiment represented in FIGS. 1-7 or FIGS. 9*a*-9*b*, the covering 12 has a number of flaps 20 equal to six, three by three along the respective opposite sides and astride each one of the curved portions 22 and 23. The consecutive flaps 20 of each of the two groups of three flaps 20 are in contact in the region of the second perimeter profile 18.

Figures 7, 8A, 8B, 9A, 9B, 10A, 10B, 11A, 11B:
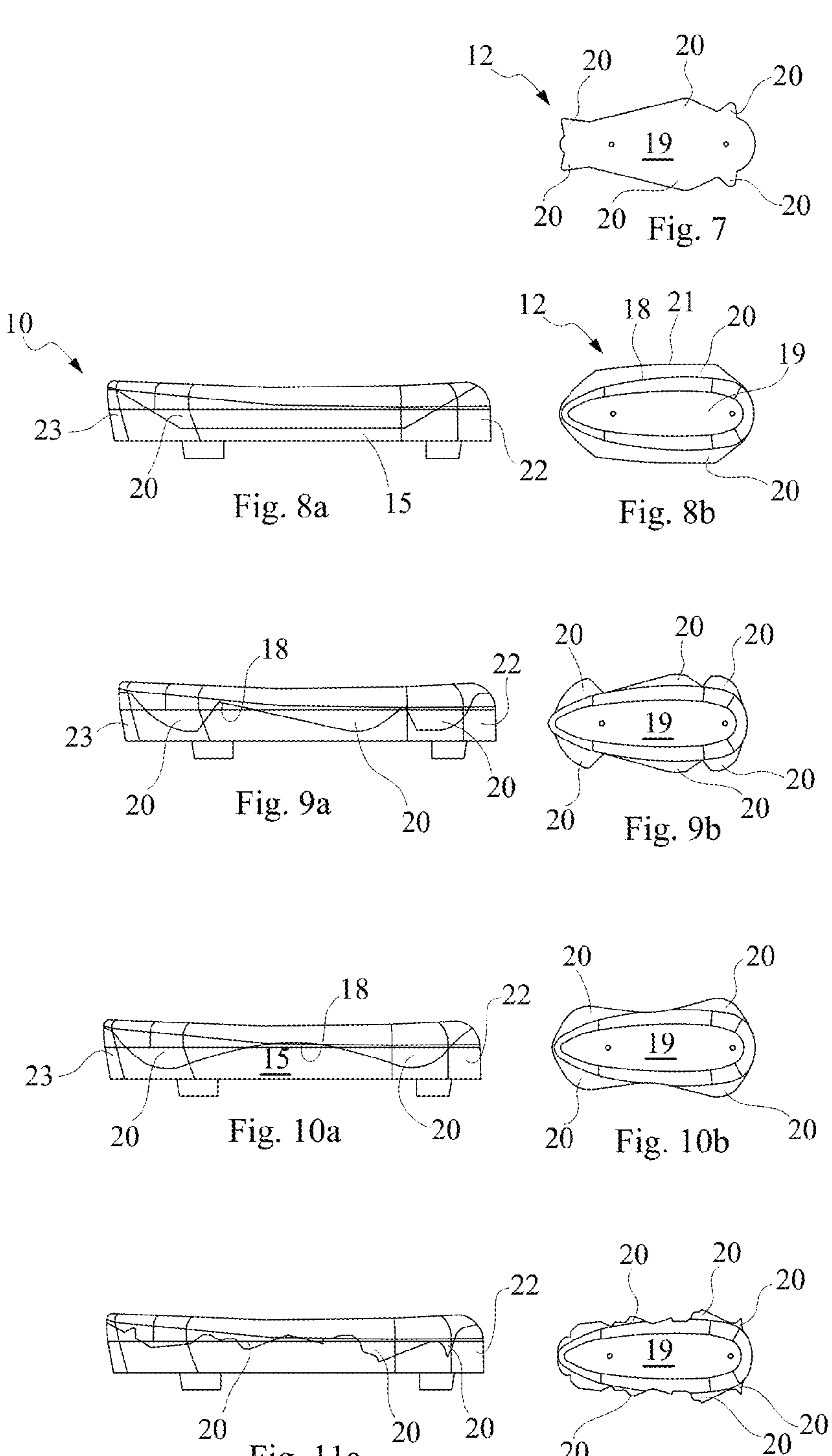
FIG. 7 represents the flat development of a detail of the butt plate of the previous figures.
FIGS. 8*a*, 9*a*, 10*a*, 11*a* are orthogonal views in side elevation of the butt plate according to further embodiments of the invention.
FIGS. 8*b*, 9*b*, 10*b*, 11*b* represent the flat development of a detail of the butt plate of FIGS. 8*a*, 9*a*, 10*a*, 11*a*, respectively.

In the example of FIGS. 8*a*-8*b*, the perimeter of the covering 12 has a number of flaps 20 equal to two, each along a respective one of the opposite sides of the damping member and preferably astride each one of the curved portions 22 and 23.

In the example of FIGS. 10*a*-10*b*, the perimeter of the covering 12 has a number of flaps 20 equal to four, two by two along the respective opposite sides of the damping member and preferably astride each one of the curved portions 22 and 23. Preferably the consecutive flaps 20 of each of the two groups of two flaps 20 are in contact in the region of the second perimeter profile 18.

In the example of FIGS. 11*a*-11*b*, the perimeter of the covering 12 comprises a sequence of flaps 20 bearing a profile with partly broken and partly curvilinear segments.

The anchoring base 13 is for example made from polypropylene and, in addition to acting as a support for fixing the butt plate 10 to the stock of the firearm, it confers structural rigidity to the butt plate itself. The base 13 can be provided with anchoring elements 24 at the aforementioned weapon, which in particular comprise seats 25 for housing screws, not illustrated in the figures. In particular, the seats 25 house the head of screws suitable for fixing the butt plate 10 to the weapon, which are positioned therein by inserting them through expandable holes 26 and 27 which are defined respectively on the covering 12 and on the damping member 11, aligned with each other and aligned with the central axis of the seats 25. In embodiments, a pair of seats 25, and consequently the holes 26 and 27, are obtained substantially along the longitudinal axis A, so as to achieve an effective fixing of the butt plate 10 along its main extension direction. On the surface of the butt plate 10 intended to come into contact with the aforementioned stock and substantially in the region of the seats 25, moreover, centering elements 28, in particular shoulders, are defined for mutual association.

The base 13 is also provided with through openings 29, having longitudinal extension along axes parallel to the longitudinal axis A. In particular, according to the embodiment represented in the figures, the base 13 is provided with three through openings 29, a central one 29*a* along the longitudinal axis A and two lateral ones 29*b* and 29*c*. The same base 13 is also provided with a further through opening 30, crossed by the longitudinal axis A and defined substantially in proximity/at one of the curved portions 22 or 23. These openings 29 and 30 are configured to inject the material of the damping member 11 through them and to ensure that it is substantially homogeneously distributed along the main extension direction. In the region of the openings 29, corresponding blind recesses 31 (a central one 31*a* and two lateral ones 31*b* and 31*c*) are defined on the damping member 11; more particularly, they are defined on its face turned towards the base 13, as represented in the sectional view of the example of FIG. 4, and have the same development along the longitudinal axis A.

Advantageously, the recesses 31*a*, 31*b* and 31*c* and the openings 29*a*, 29*b* and 29*c* allow the butt plate to be lightened. In addition, a similar and respective coupling between the recesses 31*a*, 31*b* and 31*c* and the openings 29*a*, 29*b* and 29*c* allows both to guarantee to the damping member 11 a greater volume of deformation (compared to the only contribution given by the elasticity of the material with which it is made), and an escape of the air enclosed therein in the direction indicated by the arrow of FIG. 4 when the butt plate 10, and in particular the damping member 11, is compressed (for example following the recoil of the weapon).

The operation of the butt plate 10 appears clear and intuitive from what has been described so far. More particularly, through the anchoring elements 24 it is fixed to the stock of a firearm and is rested, in condition of use, on the shoulder of a user with its contact portion 19. When a shot is fired with the weapon, the damping member 11 cushions the recoil and/or impact of the weapon with respect to the user's body, both thanks to the elasticity of the material with which it is made, and thanks to the recesses 31 coupled to the openings 29.

In practice, it has been found that the invention fulfils the task and at least some of the objects set out by making a butt plate that is structurally solid, as it is made as a single member, and substantially free of wrinkles on its covering.

An important advantage of the invention consists in the fact that the butt plate has an external appearance that can be customized through application of a wide range of coverings.

Another advantage of the invention lies in the fact that the butt plate is simple, fast and economical to manufacture, not requiring the application of an adhesive between the damping member and the covering.

The invention claimed is:

1. A butt plate comprising a damping member which is made from resiliently flexible material and a covering which at least partially covers said damping member, said damping member being made from injectable material and being over-injected on said covering so as to form a single member with said covering, said covering having a perimeter comprising at least two flaps which extend astride said damping member.

2. The butt plate according to claim 1, wherein said covering is made from a material selected from the group consisting of: woven fabric, non-woven fabric, leather and artificial leather.

3. The butt plate according to claim 1, comprising a base for anchoring to a stock of a firearm.

4. The butt plate according to claim 3, wherein said single member also comprises said base.

5. The butt plate according to claim 3, wherein said damping member is over-injected both on said covering and on said base.

6. The butt plate according to claim 3, wherein said damping member comprises a main surface opposite said base and a lateral surface which extends between said base and said main surface, said main and lateral surfaces being at least partially covered by said covering, said at least two flaps extending in a region of said lateral surface.

7. The butt plate according to claim 6, wherein said main and lateral surfaces define a surface with three-dimensional curvature.

8. The butt plate according to claim 6, wherein said covering is peripherally terminated in the region of said lateral surface.

9. The butt plate according to claim 6, wherein said covering comprises a contact portion which is arranged so as to cover said main surface and which is configured to face a user's body, said at least two flaps projecting away from said contact portion.

10. The butt plate according to claim 9, wherein said at least two flaps have a tapered shape in a direction away from said contact portion.

11. The butt plate according to claim 1, wherein at least two consecutive ones of said at least two flaps are spaced apart from each other.

12. The butt plate according to claim 1, further comprising a pre-printed graphic on said covering.

13. The butt plate according to claim 1, wherein said resiliently flexible material is a plastic material.

14. The butt plate according to claim 13, wherein said plastic material is a thermoplastic rubber.

15. The butt plate according to claim 1, wherein said damping member comprises a main surface, configured to face a user's body, and a peripheral lateral surface which extends from said main surface, said at least two flaps extending in a region of said lateral surface.

16. The butt plate according to claim 2, further comprising a pre-printed graphic on said covering.

17. The butt plate according to claim 3, wherein the damping member is over-injected both on said covering and on said base so as to make a single member with said covering and said base.

18. A method for making a butt plate comprising:

providing a covering having a perimeter comprising at least two flaps;

positioning said covering in a mold so that said at least two flaps are configured to extend astride a damping member to be formed;

over-injecting an injectable resiliently flexible material onto said covering to form said damping member, making a single member with said covering, wherein said covering at least partially covers said damping member and said at least two flaps extend astride said damping member.

19. The method according to claim 18, further comprising:

positioning an anchoring base in the mold prior to said over-injection, wherein said injectable resiliently flexible material is over-injected both on said covering and on said base so as to make a single member that integrates said covering, said damping member and said base.

20. The method according to claim 18, wherein said covering is made in a material selected from the group consisting of:

woven fabric, non-woven fabric, leather and artificial leather, and wherein the method further comprises:

pre-printing a graphic on said covering prior to said positioning in the mold.

* * * * *